Sept. 17, 1968 P. SAHUT D'IZARN 3,402,283
CONDITIONAL JUMP SEQUENCING ARRANGEMENT
FOR A COUNTER REGISTER OF A COMPUTER
Filed Jan. 19, 1966
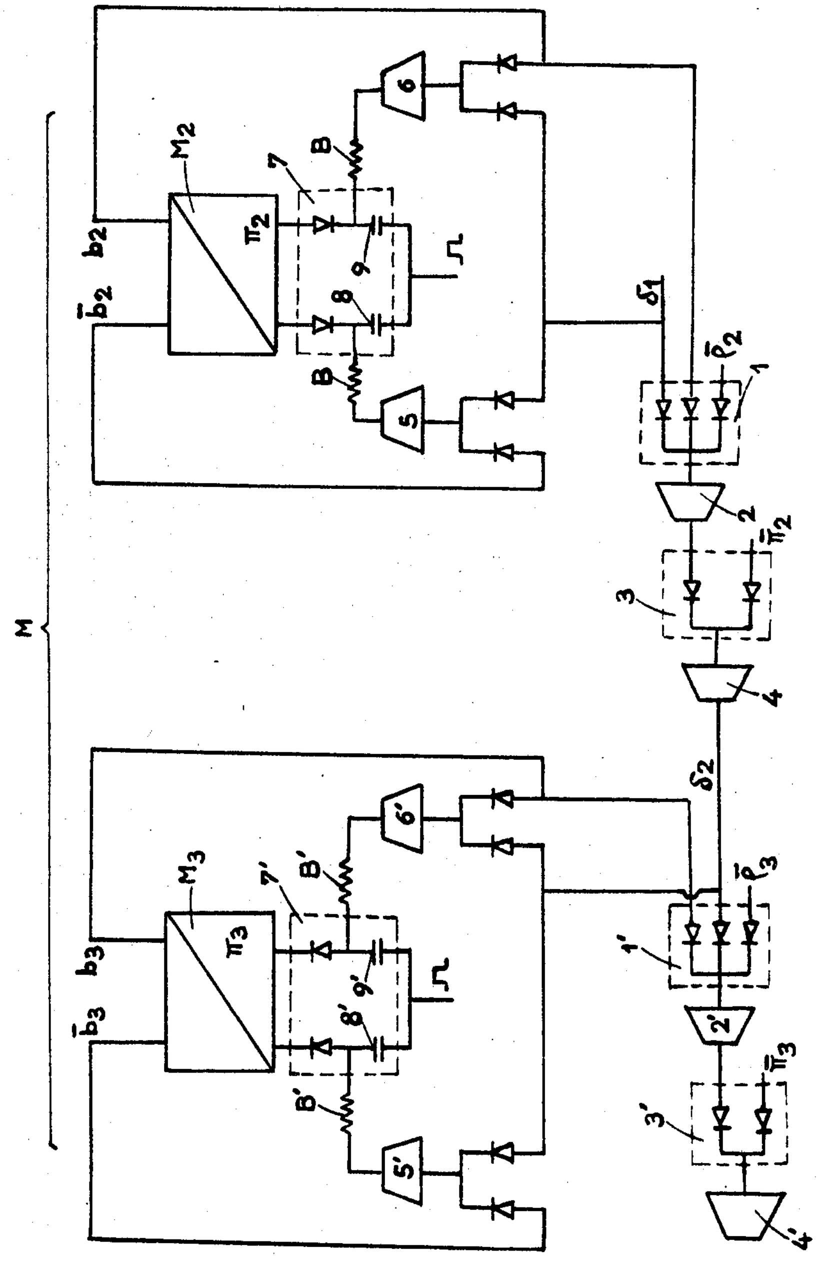

United States Patent Office 3,402,283

Patented Sept. 17, 1968

3,402,283
CONDITIONAL JUMP SEQUENCING ARRANGEMENT FOR A COUNTER REGISTER OF A COMPUTER

Philippe Sahut d'Izarn, Paris, France, assignor to Societe de Constructions Electromecaniques Jeumont-Schneider, Paris, France, a company of France Filed Jan. 19, 1966, Ser. No. 521,598
Claims priority, application France, Jan. 21, 1965, 2,787
1 Claim. (Cl. 235—92)

The present invention has for its object a sequencing arrangement for a transistorised counter register for a computer having $n$ stages, each comprising a trigger controlled by a circuit having two inputs, when the said inputs are in different logic states, the two inputs being constituted, one by an AND circuit receiving the content of the trigger in question and the carry from the preceding stage, the other by an AND circuit receiving the complement of the trigger in question and the carry from the preceding stage.

In a computer it is necessary to reduce to the maximum extent, the time for executing instructions. The period for executing an instruction varies according to the instruction to be carried out. A clock arrangement counts the number of elementary units of time for which an instruction lasts.

The internal logic of the computer indicates which phase in an instruction the operator must carry-out, according to the value of the number of units of time totalled by the clock. During the course of execution of different instructions similar phases may be encountered: thus a multiplication instruction includes steps of addition. A conditional jump sequencing arrangement enables the same elementary instructions within different instructions to be carried-out at the same time. Characteristic values of the counter register of the computer are assumed at very specialised phases of certain instructions. The succession of operations is simplified as it suffices to make the counter make one jump and not at different phases which follow, which may be many and varied.

One method of advancing in time or on the contrary retarding the result displayed by the counter consists in wiring the trigger of the lowest order in a different manner, and wiring the triggers of the other orders in the usual way, that is to say, in a counter. To make the counter jump a number of units of time, successive productions of carry signals take place at the lowest stage and are reflected in the higher stages.

The sequencing arrangement according to the invention, is applied to a counter register wired in a special manner which enables the time to be advanced or on the contary retarded, according to the existence of conditions for creation of carry signals, or blocking of carry signals. It is characterised by the fact that it comprises a first AND circuit, two inputs of which receive, one the carry from the preceding stage, the other the content of the trigger in question, and a third input of which is constituted by a command not to block the carry signals, the first AND circuit being connected by means of a first NOT circuit, to a second AND circuit with a command not to pass the carry signals, the output of this second AND circuit being connected to a second NOT circuit, the output of which constitutes the carry of the stage under consideration.

The single figure represents two stages of a counter register having $n$ stages according to the invention. The order of the stage is indicated by the indices to the letters. All the stages are identical. An AND circuit 1 has three inputs, one receiving the content $b_2$ of a trigger $M_2$ of the register M, another the carry $\mathfrak{F}_1$ of the preceding stage and the third the complement $\overline{P_2}$ of the condition for blocking the carry signals is connected to a NOT circuit 2 formed by a pnp type transistor. The output from the NOT circuit 2 is combined in the AND circuit 3, with the complement $\pi_2$ of the condition for producing carry signals and enters the NOT circuit 4 formed by a pnp type transistor. The output from the NOT circuit 4 constitutes the carry $\overline{\gamma_2}$ of the stage 3. The output $\mathfrak{F}_2$ of the NOT circuit 4 also reaches two NOT circuits 6′ and 5′ after having been combined in an AND circuit with, on the one hand, the content $b_3$ of a trigger $M_3$ of the register M, and on the other hand with the complement $\overline{b}_3$ of the same trigger $M_3$ of the register M. The outputs of NOT circuits 5′ and 6′ excite two resistances B′ controlling a gate circuit 7′ in which a trigger pulse is delivered by two capacitors 8′ and 9′ to all the triggers of the register M, the gate being open when its two inputs are in different states.

The operation of the arrangement will now be described with reference to the drawing. The progress of the carry signals may have two aspects, one of normal operation and the other of disturbed operation.

If the operation is normal, the arrangement behaves as a counter register having $n$ triggers in which, for all stages, the condition of blocking the carry signals P has the logical value 0 and the condition of creating carry signals $\pi$ has the logical value 0.

The operation may be disturbed in two ways for example, to avoid making the computer execute phases which are ineffective for the processed configuration, the number displayed by the counter must jump several units, for example, pass from the number expressed in binary form as 1001 to the number expressed in binary form as 1111. For this it is convenient to create carry signals in stages two and three, that is to say, to give the value 1 to the condition for creating carry signals $\pi$ for stages two and three. In this event, the conditions of creating $\pi$ and blocking P of the carry signals in stages 1 and 4 are nil, the condition of blocking the carry signals P in stages two and three is nil. If the content $b_2$ of the store $M_2$ is the binary symbol 0, if the carry of stage $\mathfrak{F}_1$ is the binary symbol 1, the output of the logical circuit 1 of which the inputs are constituted by the inputs $\mathfrak{F}_1$, $b_2$ and $\overline{P}_2$ are expressed logically.

$$\mathfrak{F}_1 \cdot \overline{P_2} \cdot b_2 = 0$$

The output of the NOT circuit 2 is expressed:

$$\overline{\mathfrak{F} \cdot \overline{P_2} \cdot b_2} \text{ being } 1$$

The output of the logical AND circuit 3 is expressed:

$$\overline{b_2 \cdot \overline{P_2} \cdot \mathfrak{F}_1} \cdot \pi_2 \text{ being } 0$$

The output of the NOT circuit 4 inverts this result which takes the value 1, which is the value of the reserve $\mathfrak{F}_2$.

In certain cases, it could be that one wishes to retrogress the number displayed by the counter, for example, to pass from the number expressed in binary form as 1111 to the number expressed in binary form as 1001. In this event the conditions of creating $\pi$ and blocking P of the carry signals at stages two and three are nil, the condition of blocking the carry signals P at stages one and three has the logical value 1. If the content $b_1$ of the store $M_1$, whose stage is not shown, is the binary symbol 1, and if the carry signal of stage $\mathfrak{F}_0$ is the binary symbol 0, a carry signal blocking condition is delivered to stage 1, $P_1=1$, and consequently $P_1=0$ and $\overline{\pi_1}=1$. The output of the logical AND circuit 1 is expressed logically:

$$b_1\cdot\mathfrak{R}_0\cdot\overline{P_1}=0$$

The output of the NOT circuit 2 of the first stage is expressed:

$$\overline{\mathfrak{R}_0\cdot b_1\cdot\overline{P_1}}=1$$

The output of the logical AND circuit 3 of the first stage is expressed:

$$\overline{b_1\cdot\mathfrak{R}_0\cdot\overline{P_1}}\cdot\pi_1=1$$

The NOT circuit 4 of the first stage inverts this result which takes the value 0, which is the value of the reserve $\mathfrak{R}_1$.

Of course the invention is not limited to the details of the embodiment which has just been described. These could be modified without departing from the scope of the invention.

I claim:

1. A conditional jump sequencing arrangement for a transistorised counter register for a computer having *n* stages each comprising a trigger controlled by a circuit having two inputs, when the said inputs are in different logical conditions, the two inputs being constituted, one by an AND circuit securing the content of the trigger under consideration and the carry from the preceding stage, the other by an AND circuit receiving the complement of the trigger in question and the carry from the preceding stage, the arrangement being characterised by the fact that it comprises for a given stage, a first AND circuit two inputs of which receive, one the carry from the preceding stage, the other the content of the trigger in question and a third input which is constituted by a command not to block the carry signals, the first AND circuit being connected through a first NOT circuit to a second AND circuit with a command not to pass the carry signals, the output of this second AND circuit being connected to a second NOT circuit; the output of which constitutes the carry signal of the stage in question.

References Cited

UNITED STATES PATENTS

| | | | |
|---|---|---|---|
| 3,063,016 | 11/1962 | Halton | 235—92 |
| 3,234,373 | 2/1966 | Sellers | 235—92 |
| 3,264,455 | 8/1966 | Götz | 235—92 |
| 3,310,660 | 3/1967 | Cogar | 235—92 |
| 3,354,295 | 11/1967 | Kulka | 235—92 |

MAYNARD R. WILBUR, *Primary Examiner.*

G. J. MAIER, *Assistant Examiner.*